United States Patent
Hartel et al.

(10) Patent No.: US 7,275,947 B2
(45) Date of Patent: Oct. 2, 2007

(54) FRAME COMPRISING AN ELECTRIFYING DEVICE

(75) Inventors: Marc Hartel, Reiskirchen (DE); Sven Laurösch, Haiger (DE); Ralf Dahmer, Olpe (DE); Jörg Kreiling, Biebertal (DE)

(73) Assignee: Rittal GmbH & Co. KG, Herborn (DE)

( * ) Notice: Subject to any disclaimer, the term of this patent is extended or adjusted under 35 U.S.C. 154(b) by 12 days.

(21) Appl. No.: 10/530,662

(22) PCT Filed: Feb. 19, 2004

(86) PCT No.: PCT/EP2004/001567

§ 371 (c)(1),
(2), (4) Date: Apr. 6, 2005

(87) PCT Pub. No.: WO2004/077907

PCT Pub. Date: Sep. 10, 2004

(65) Prior Publication Data

US 2006/0044766 A1    Mar. 2, 2006

(30) Foreign Application Priority Data

Feb. 27, 2003 (DE) ............................... 103 08 389
Feb. 27, 2003 (DE) ........................... 203 18 511 U

(51) Int. Cl.
*H01R 4/60* (2006.01)

(52) U.S. Cl. ........................................ 439/215

(58) Field of Classification Search ................ 439/215, 439/211, 717, 716
See application file for complete search history.

(56) References Cited

U.S. PATENT DOCUMENTS 3,949,277 A    4/1976    Yosset (Continued)

FOREIGN PATENT DOCUMENTS

AU    529226    6/1983

(Continued)

*Primary Examiner*—Tulsidas C. Patel
*Assistant Examiner*—Phuongchi Nguyen
(74) *Attorney, Agent, or Firm*—Pauley Peterson & Erickson

(57) ABSTRACT

A frame support for a rack or a switchgear cabinet, having an electrification arrangement combined with at least one frame leg or profiled mounting element for supplying and/or removing electrical current to or from devices which can be connected with the frame support. Simple and definite electrical connecting possibilities for electrical devices are accomplished with the electrification arrangement having at least one separate electrification strip attached to a frame leg or profiled mounting element which is formed by a hollow profiled receiving element and is at least partially open on a long side and in at least one hollow space of the profiled receiving element contact rails or connection lines are installed in a manner protected against electric shock. Inserts are provided, which are inserted or can be inserted into the electrification strip and have plug receivers protected against electric shock for device plugs of the devices to be connected, as well as contact elements which are or can be brought into electrical contact with the contact rails.

35 Claims, 8 Drawing Sheets

U.S. PATENT DOCUMENTS

| | | | | |
|---|---|---|---|---|
| 5,203,713 A | * | 4/1993 | French et al. | 439/215 |
| 5,574,612 A | * | 11/1996 | Pak | 361/93.1 |
| 5,670,743 A | * | 9/1997 | Welch et al. | 174/377 |
| 5,784,841 A | * | 7/1998 | Nowell | 52/220.5 |
| 6,350,135 B1 | * | 2/2002 | Acklin et al. | 439/211 |
| 6,384,336 B1 | * | 5/2002 | VanderVelde et al. | 174/95 |
| 6,491,535 B1 | * | 12/2002 | Buse | 439/215 |
| 6,547,588 B1 | * | 4/2003 | Hsu et al. | 439/535 |

FOREIGN PATENT DOCUMENTS

| | | |
|---|---|---|
| DE | 77 05 221 | 6/1977 |
| DE | 32 14 133 A1 | 2/1983 |
| DE | 33 44 598 C1 | 9/1984 |
| DE | 37 06 797 A1 | 9/1987 |
| DE | 38 17 440 A1 | 11/1989 |
| DE | 40 13 370 A1 | 10/1991 |
| DE | 44 39 551 C1 | 12/1995 |
| DE | 196 47 814 A1 | 5/1998 |
| DE | 199 11 196 A1 | 9/2000 |
| DE | 199 32 561 A1 | 2/2001 |
| FR | 2 589 291 | 4/1987 |

* cited by examiner

FRAME COMPRISING AN ELECTRIFYING DEVICE

BACKGROUND OF THE INVENTION

1. Field of the Invention

This invention relates to a frame support for a rack or a switchgear cabinet, having an electrification arrangement, which is combined with at least one frame leg or profiled mounting element, for supplying and/or removing electrical current to or from devices which can be connected with the frame support.

2. Discussion of Related Art

A frame support is taught by German Patent Reference DE 37 06 797 A1. In this known frame support, hollow vertical supports and hollow horizontal supports, which are connected by extension channels with the frame support and have an identical profile cross section as the vertical supports, wherein hollow spaces of the vertical supports and horizontal supports provide as much cable guidance space as possible for conducting electrical cables placed in them. On the other hand, with frame supports for switchgear cabinets, racks or workplace systems with table structures used in connection with information technology in particular, it is helpful to keep the frame legs of the smallest possible size, but with the greatest amount of stability and, in connection with a switchgear cabinet, for example, to utilize the interior for installing devices in an as unlimited as possible way.

As German Patent Reference DE 40 13 370 A1 shows, in the field of electrical installation technology cable conduits exist, which have a cover, in which contact rails are conducted, which are embedded in the linear direction in an insulating material. Installed devices, which can contact with the installation rails, are snapped onto the arrangement.

Various frame supports for switchgear cabinets, i.e. inter alia also cabinets for information technology apparatus, are shown in German Patent References DE 33 44 598 A1, DE 44 39 551 A and DE 196 47 814 A1, wherein in view of simple varied assembly options the frame legs, as well as the line-up or sealing, are optimized.

SUMMARY OF THE INVENTION

One object of this invention is to provide a frame support of the type above but which, along with the least possible cost outlay, offers improved installation options for devices to be supplied with electricity, and to disclose an electrification arrangement which is easy to integrate into a frame support.

This object is achieved with an electrification arrangement having at least one separate electrification strip attached to a frame leg or profiled mounting element which is formed by a hollow profiled receiving element at least partially open on a long side and in whose at least one hollow space contact rails or connection lines are installed in a manner protected against electric shock. Inserts are provided, which are inserted or can be inserted into the electrification strip and have plug receivers protected against electric shock for device plugs of the devices to be connected, as well as contact elements, which are or can be brought into electrical contact with the contact rails or connecting lines.

With such a design of the electrification arrangement, easily accessible, defined connecting options for the electrical devices received in or on the frame support exist without elaborate cable conduits, wherein the electrification strip can also easily be retrofitted and prefitted with inserts suitable for the requirements of the user. For example, the electrification strip can also be attached to the inside of a door arranged on the frame. The exchange of the electrification strip with one of different fittings is possible in a simple and cost-effective manner. Because a central component of the electrification arrangement is predetermined and adheres to the protection requirements, an inappropriate electrical installation and overloading of current-conducting elements is prevented.

In one embodiment a profiled insulating element, in which the contact rails are embedded and are accessible in a manner protected against electric shock through access openings formed in the profiled insulating element, is inserted into at least one hollow space of the profiled receiving element.

Simple operation and measures for protecting users are achieved if the hollow space is shaped rectangular or square in cross section and has a base wall located opposite the open longitudinal side, which is adjoined by lateral walls, and the bottom of a bottom section of the profiled insulated element in which the contact rails are embedded faces the base wall or a lateral wall. The contact rails can be brought into contact with the contact elements via access openings, which are kept narrow for electric shock protection and are cut into the bottom section of the side located opposite the bottom side.

Steps also contribute to a construction which is advantageous for manufacture, wherein the insulated profiled element is fixed in place in the profiled receiving element by snap-in structures arranged on it and complementary counter snap-in structures arranged in the profiled receiving element.

Steps for preventing inappropriate use are advantageous, wherein the snap-in structures and the counter snap-in structures have steep snap-in flanks opposite the insertion direction, so that the profiled insulating element cannot be removed without being destroyed.

Assembly and a secure structure are achieved when the profiled insulating element is assembled from a profiled base insulating part, which receives the contact rails in longitudinal chambers and insulates them from each other, and a profiled top insulating part, which covers the contact rails and has access openings.

Dependable electric shock protection and a definite arrangement of the inserts are achieved if the access openings of each insert are formed by a group of at least two hole-shaped access openings, which are assigned to separate contact rails.

A definite arrangement of the inserts is enhanced if at least two access openings are offset from each other in the longitudinal direction of the profiled insulating element.

Steps can be advantageous for contacting and the shape of the inserts, wherein the contact elements are designed as contact pins matched in size and position to the access openings.

Those steps contribute to simple assembly, wherein the inserts have snap-in elements, by which they can be fixed in place so they cannot be removed from the profiled receiving element or the counter snap-in elements formed on the profiled insulating element without being destroyed, or can only be removed by using a tool.

If at least three contact rails are embedded in the profiled insulating element, by which at least two separate current supply circuits are formed, it is simple to change, for example, from a standard current supply by the power lines to an interruption-proof power supply, when the standard current supply fails. Alternatively, the separate supply circuits can also be used for avoiding an overload if the number of the inserts used is distributed over the different current supply circuits. For example, a contact rail located in the center can be embodied as the ground rail and can also be designed stronger in comparison to the contact rails located laterally next to it, or can be arranged at a higher level or a lower level. For example, with the contact rails assigned to the three phases, it is possible to form three standard current supply circuits with the central ground rail.

In one embodiment, for the use of standardized built-in devices, the dimension of the inserts in the longitudinal direction of the electrification strip is a unit of height or a whole-number multiple thereof, and the inserts are designed for receiving one or several appliance plugs.

A simple and unequivocal assembly wherein, for example, the pattern of the frame legs in relation to a pattern or marking of the electrification strip can be used, if the profiled receiving element has on at least one longitudinal side fastening elements for connection with at least one frame leg or profiled mounting element. In one embodiment it is possible for the fastening elements to be embodied for a screw, clip, snap-in, plug or clamping connection.

The frame support can be arranged so that the profiled receiving element is H-shaped in cross section with two lateral walls and a center wall, and the inserts are placed into the hollow space on a side of the center wall facing the user, while the contact rails or the connecting lines are placed into the hollow space facing away from the user and are accessible through the center wall.

The steps, cutouts in the center wall, have plug-in couplings inserted and protected against electric shock, which are accessible from the user side. At least one plug unit matched to the plug-in couplings is arranged on the back of the inserts facing away from the user, and contributes to a simple mounting with a definite arrangement.

The simple use of different current supply arrangements is achieved if two plug-in couplings per insert, which are spaced apart from each other in the longitudinal direction of the profiled receiving element, are provided and are connected to different current supply arrangements. The backs of the inserts for selecting one of the two current supply arrangements can be inserted into the profiled receiving element rotated by 180° and can be connected with the respective plug-in coupling. The user can simply provide, for example, a standard current supply or an interruption-proof current supply.

A structure can have a simple operation if the inserts are modular housings with cap-like closure pieces which, from one of the adjoining narrow sides, is placed on their ends which are remote from each other in the longitudinal direction, and on the sides of which the snap-in elements are formed of one piece with resilient snap-in fingers and actuating elements for release.

An overload release device can be integrated into the inserts.

Also, there are advantageous steps for connecting the electrification arrangement, wherein at least one electric shock protected current feed-in coupling for the current supply is arranged in an end section of the profiled receiving element, and a current feed-in plug matched to the current feed-in coupling and having a current supply cable connected therewith is provided.

Further embodiments have the current feed-in coupling embodied on or in a feed-in module, and a line element for voltage conversion or adaptation, a current limiting device and/or a switching element for the sequential activation of individual inserts is integrated into the feed-in module.

The electrification arrangement for a rack or a switchgear cabinet can be designed with a structure as described in this specification and in the claims.

BRIEF DESCRIPTION OF THE DRAWINGS

This invention is explained in view of exemplary embodiments and the drawings, wherein.

DESCRIPTION OF PREFERRED EMBODIMENTS

Figure 1:
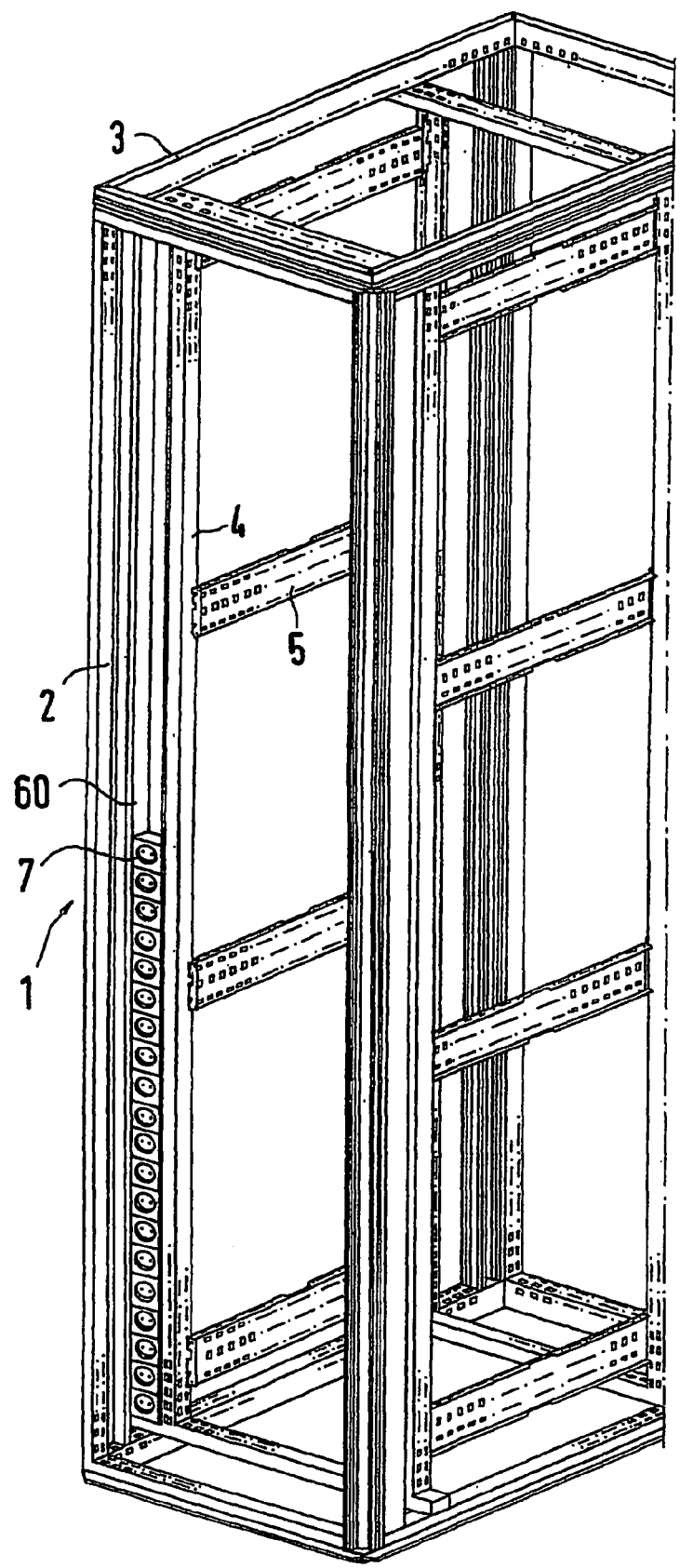
FIG. 1 is a perspective view of a frame support with profiled mounting elements integrated into it, and a vertical electrification strip.
Figure 2:
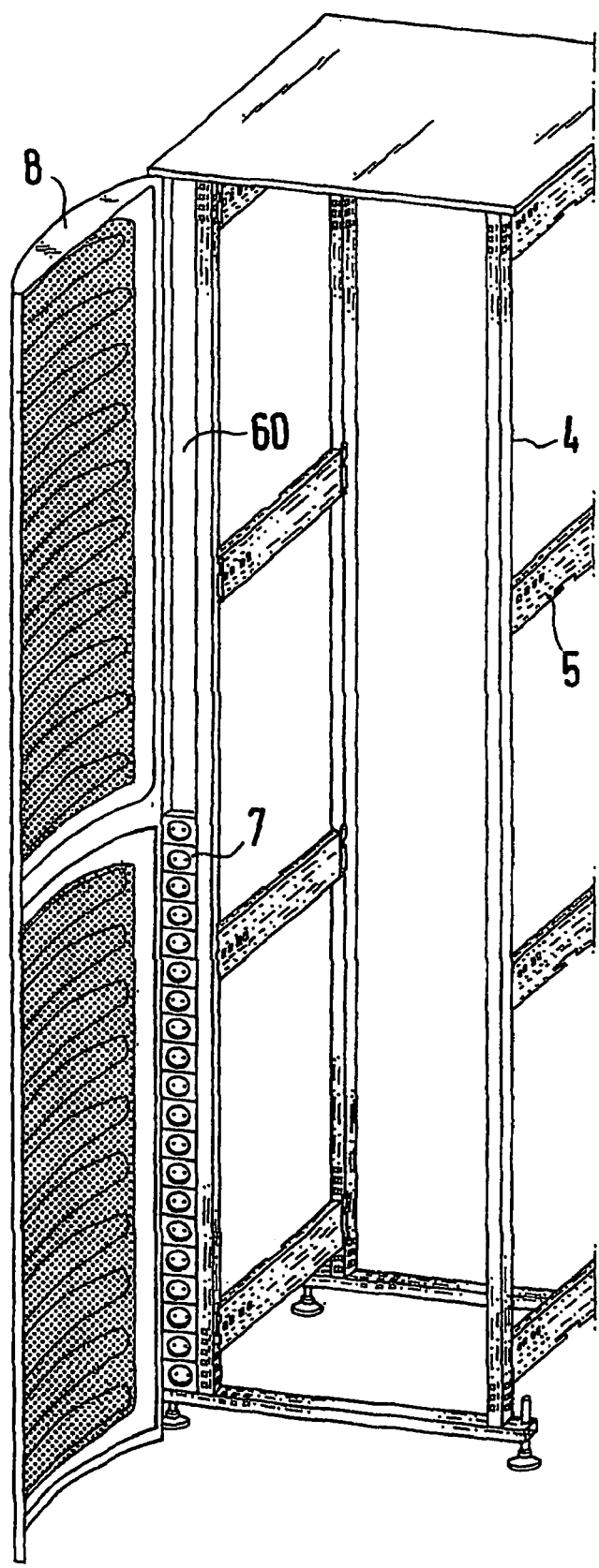
FIG. 2 shows an electrification strip mounted corresponding to FIG. 1 along a vertical profiled mounting element of a switchgear cabinet frame support behind a door edge, in a perspective view.
Figure 3:
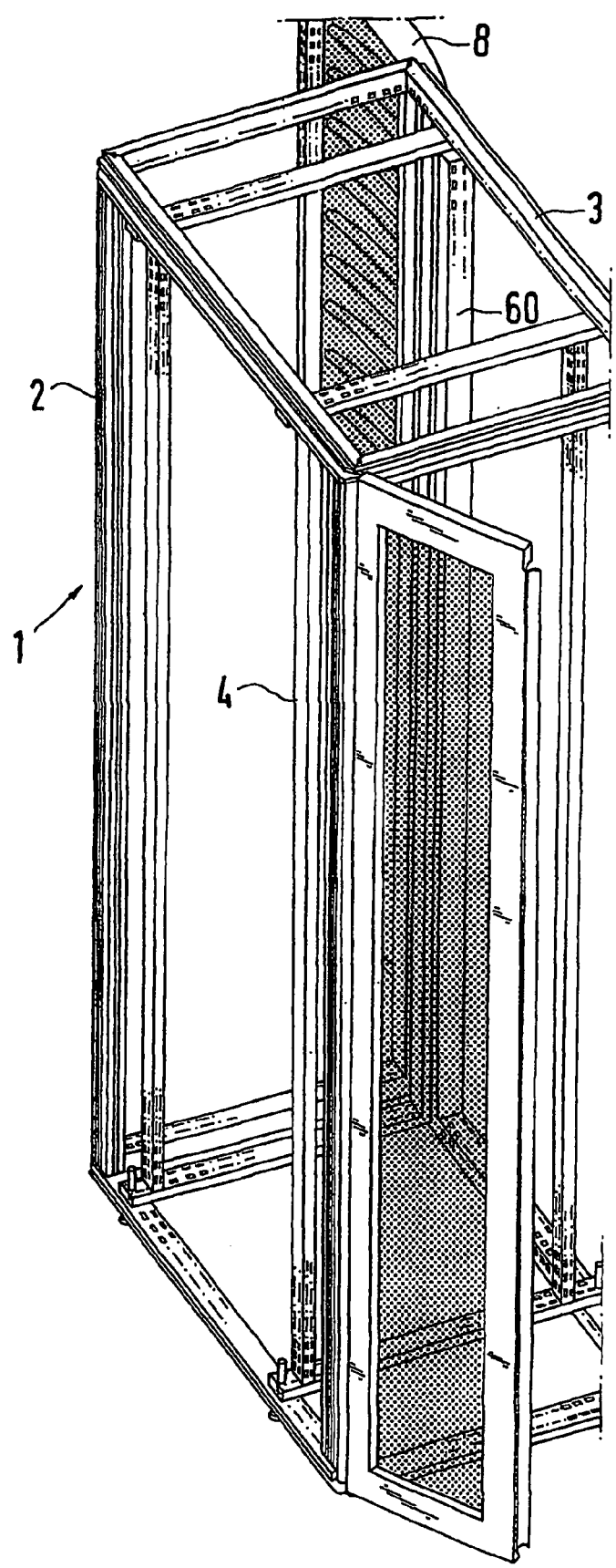
FIG. 3 shows another frame support of a switchgear cabinet with an installed door and an electrification strip mounted along a vertical profiled mounting element, in a perspective plan view from the rear in contrast to FIG. 2.

A frame support 1 made of vertical frame legs 2 and horizontal frame legs 3 represented in FIG. 1, which can be complemented, for example by wall elements and one or more door elements 8 (see FIGS. 2 and 3), into a switchgear cabinet and can receive devices of information technology, for example, is equipped in an interior with vertical and horizontal profiled mounting elements 4, 5, as well as with an electrification strip 60 mounted along the vertical profiled mounting element 4. For example, the electrification strip 60 is mounted at the side of the vertical profiled mounting element 4 by clamps, screws, clips, snap-in or plug-in elements (not represented). As FIGS. 2 and 3 show, in this arrangement the electrification strip 60 can be advantageously covered by a vertical door edge. In this case the electrification strip 60 has socket-like inserts 7 for the supply with electrical energy. Further connecting options for inserts 7 are in the upper portion of the electrification strip 60.

FIG. 3 shows the electrification strip 60 in FIGS. 1 and 2 from a rear view. Alternatively, the electrification strip 60 can also be vertically or horizontally attached to a vertical or horizontal frame leg 2, 3, or one or several profiled mounting elements, for example in the form of mounting strips 5. The electrification strip 60 can also be easily applied to the inside of the door element 8, for example to a provided tubular door frame.

Fastening elements, for example longitudinally extending T-grooves for the insertion of a groove rail or of groove nuts, patterns of fastening holes, snap-in means, clips or plug-in means, which for example are embodied in one or several outer sides of the electrification strip 60, are provided for the attachment of the electrification strip 60. Advantageously, a U-shaped receptacle extending along at least one frame leg is formed as one piece with the receptacle, into which the electrification strip 60 is snapped with the aid of a snap-in device or snap-in means. In this case, the snap-in device or means can be longitudinal ribs or grooves extending on the outside of the electrification strip 60, and a matched counter snap-in device or means extending in the interior of the receptacle.

Figure 4A:
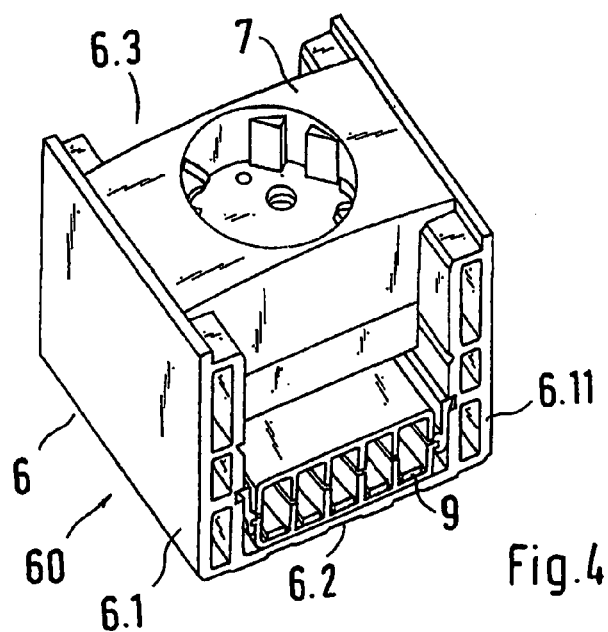
FIG. 4A shows a portion of an electrification strip with an inserted profiled insulating element and an insert, in a perspective view.
Figure 4B:
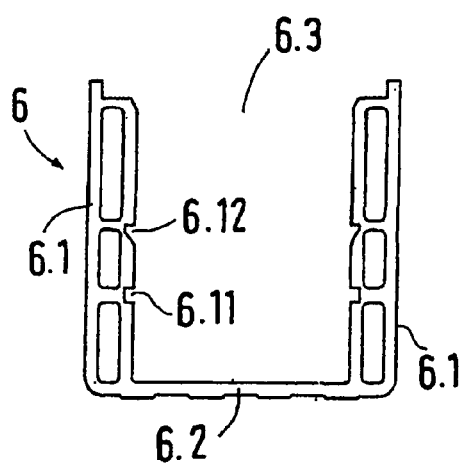
FIG. 4B shows a cross section taken through a profiled receiving element of the electrification strip in FIG. 4A.
Figure 4C:
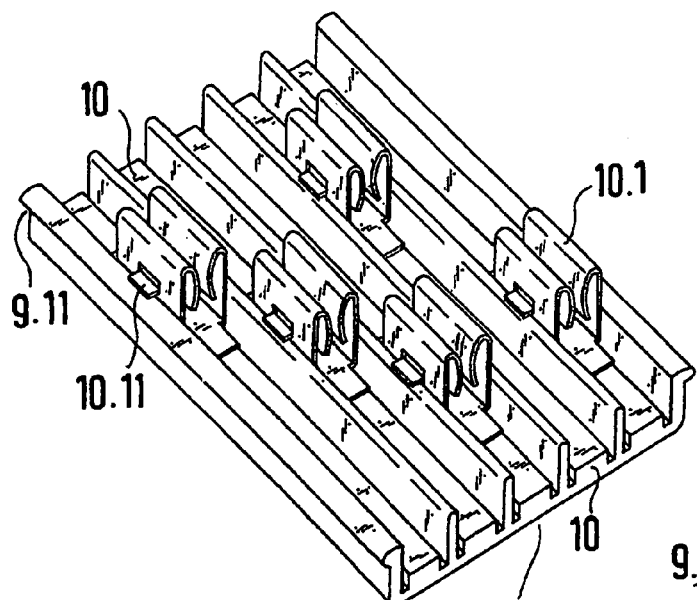
FIG. 4C shows a lower portion of a profiled insulating element with inserted contact rails, in a perspective plan view.
Figure 4D:
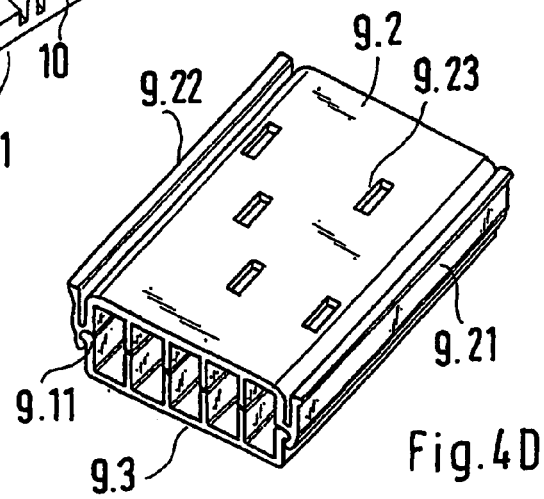
FIG. 4D shows a section of a profiled insulating element combined from a profiled base insulating part and a profiled top insulating part, in a perspective view.
Figure 6:
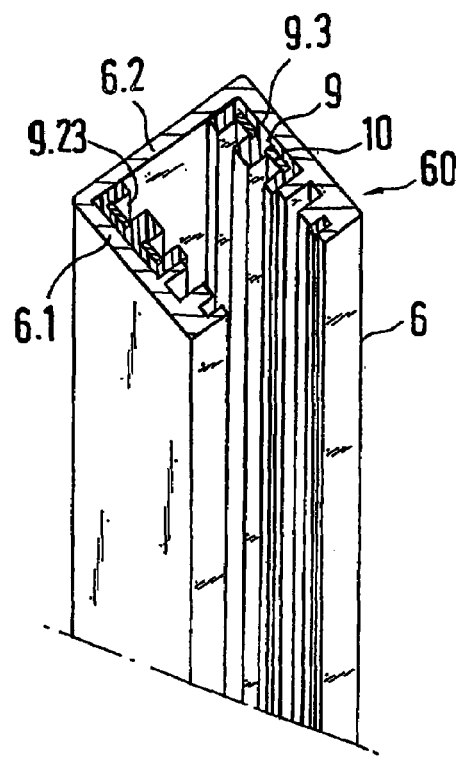
FIG. 6 shows another embodiment of an electrification strip, in a perspective view.

As shown in FIG. 4A, the electrification strip 60 has an outer profiled receiving element 6, substantially U-shaped or, as shown in FIG. 6, substantially C-shaped in cross section, as well as a profiled insulating element 9 with therein embedded contact rails 10. With its base 9.3, the profiled insulating element 9 faces the base wall 6.2 of the profiled receiving element 6 and is composed, as represented in FIG. 4D, of a profiled base insulating part 9.1, with a profiled top insulating part 9.2 clipped or snapped onto it. As shown in FIG. 4C, longitudinally extending chambers are formed in the profiled base insulating part 9.1 by vertical, longitudinally extending insulating strips, into which the contact rails 10 are inserted. For making contact, contact springs 10.1, U-shaped in cross section and with contact slits extending in the direction of the contact rails 10, are fastened on the side of the contact rails 10 facing away from the base 9.3 by laser welding, for example, and can be stabilized by support projections 10.11 resting on the strips. On the outside of their free edges, the outer strips of the profiled base insulating part 9.1 have bead-like snap-in edges 9.11 which, in the assembled state, are covered by the inside of matched facing outer strips of the profiled top insulating part 9.2 and are kept together by means of the elastic forces of the strips.

In the area of the lower edges of the lateral strips of the profiled top insulating part 9.2 facing the profiled base insulating part 9.1, respective strip-shaped snap-in springs 9.21 are formed, which are conducted at a distance from the lateral strips approximately as far as the level of the top of the profiled top insulating part 9.2, and which have snap-in hooks 9.22 on the exteriors of their free ends. The profiled receiving element 6 has snap-in grooves 6.11 as counter snap-in structures, which act together with the snap-in hooks 9.22 and which are engaged by the snap-in hooks 9.22 when the profiled insulating element 9 is completely inserted. The snap-in hooks 9.22 and the snap-in grooves 6.11 have steep snap-in flanks in the direction opposite their insertion direction, so that the profiled insulating element 9 inserted into the profiled receiving element 6 cannot be removed without being destroyed. For insertion, the snap-in hooks 9.22 are provided on their underside with inclined snap-in flanks in the insertion direction.

On its top, the profiled top insulating part 9.2 has rectangular contact openings 9.23, which are spaced apart from each other in the transverse direction corresponding to the spacing of the contact rails 10 and are oriented in the direction of the contact rails 10, and which are engaged by correspondingly flat contact pins 7.11, rectangular in cross section, which contact the contact rails 10. The contact openings 9.23 are spaced apart in the longitudinal direction of the electrification strip 60 corresponding to the contact springs 10.1 and the contact pins 7.11 are arranged on the inserts 7 (see FIGS. 5A to 5C). A coding option for the inserts 7 results with this arrangement of the contact openings 9.23 and the contact pins 7.11. For fixing the inserts 7 in place, there are snap-in fingers 7.14 with snap-in protrusions seated on their lower insert element 7.1, which engage groove-like counter snap-in elements 6.12 arranged on the inside of the lateral walls 6.1 of the profiled receiving element 6. The snap-in protrusions of the snap-in fingers 7.14 have steep snap-in flanks in the direction opposite their insertion direction, which act together with correspondingly steep snap-in flanks of the counter snap-in elements 6.12, so that the inserts 7 are dependably secured. The inserts 7 can be removed, for example by a special tool, which acts on lever-like actuating sections 7.13 of the snap-in fingers 7.14, and are arranged with respect to the snap-in fingers opposite a pivot axis of the latter. As shown in FIG. 4A, the hollow space 6.3 of the profiled receiving element is positioned so that its depth is substantially filled by the profiled insulating element 9 and the portion of the insert 7 projecting into the hollow space 9.3. The outward oriented portions of an upper insert element 7.2 rest with their shoulders on shoulders in the upper edge area of the profiled receiving element 6.

Figure 5A:
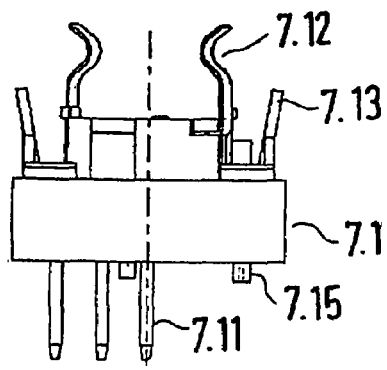
FIGS. 5A and 5B each shows a lower insert element of two sides rotated by 90° in relation to each other.
Figure 5B:
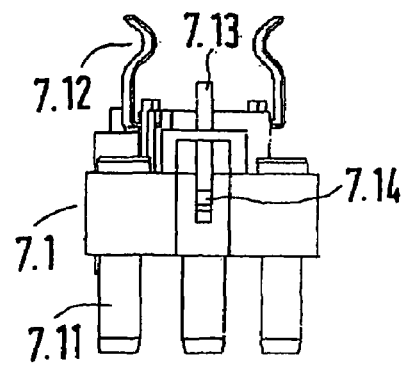
Figure 5C:
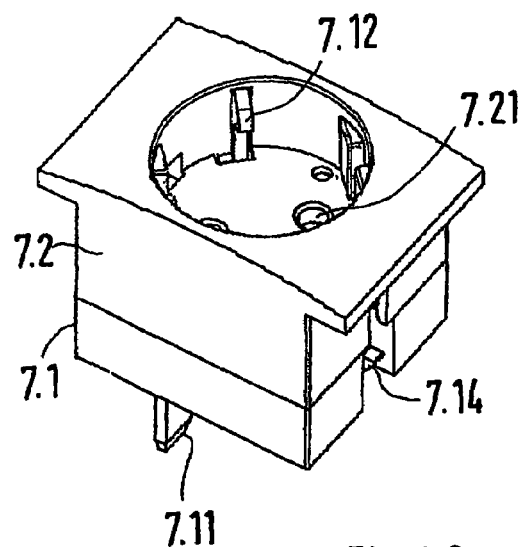
FIG. 5C shows an insert combined from a lower insert element and an upper insert element, in a perspective view.

As shown in FIGS. 5A to 5C, the lower insert element 7.1 has various elements of a current supply socket, such as a grounding spring 7.12, plug-in shoes 7.15, and also an overload release device or bridge elements. The upper insert element 7.2 has plug-in openings 7.21 corresponding to plugs to be inserted.

In the exemplary embodiment shown in FIG. 6, two partial profiled insulating elements 9 with embedded contact rails 10 are inserted into correspondingly matched receiving sections in lateral areas of the lateral wall 6.1 of the profiled receiving element 6. The contact openings 9.23 are embodied as narrow, relatively deep groove-like slits on the top of the contact rails 10, so that an appropriate electric shock protection is also thus achieved. Contact of the contact elements of the correspondingly designed inserts is provided at the sides and can be provided, for example, by an insertion process and subsequent rotating process, or by laterally shifting the contact elements in the inserts 7.

Figure 7A:
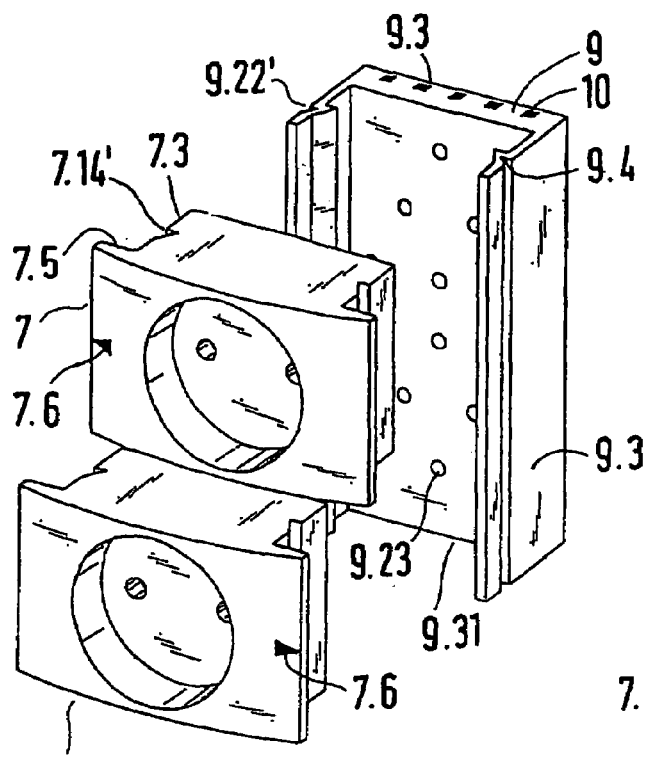
FIG. 7A shows an exploded perspective view of a further embodiment of a profiled insulating element and inserts to be placed therein.
Figure 7C:
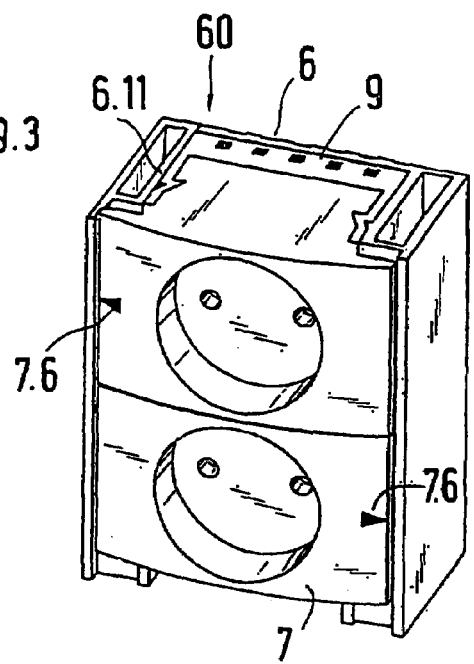
FIG. 7C shows an electrification strip as shown in FIG. 7B in an assembled representation, in a perspective plan view.
Figure 7B:
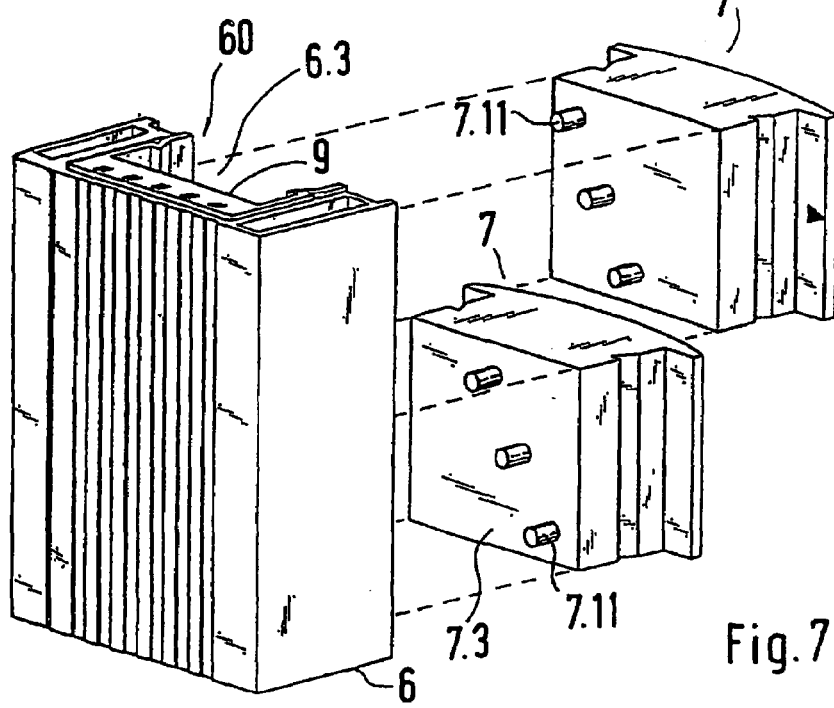
FIG. 7B shows a portion from a further electrification strip with the profiled insulating element and the inserts in accordance with FIG. 7A, in a different exploded perspective plan view.

In the further exemplary embodiment shown in FIGS. 7A to 7C, the profiled insulating element 9 is laid out in a U shape, wherein longitudinally extending snap-in grooves 9.22', which form the snap-in structure, are formed on the outsides of the U-shaped legs and which in the snapped-in state are engaged on the inside of the lateral wall 6.1 of the profiled receiving element 6 by correspondingly arranged rib-like counter snap-in structures 6.11. Here, too, steep snap-in flanks are provided in the direction opposite the insertion direction in order to prevent removal of the inserted profiled insertion element 9. For fixing the inserts 7 in place, groove-shaped snap-in elements 7.14' are arranged on the outsides of the inserts facing the U-shaped legs, and snap-in protrusions are arranged at the corresponding location of the facing insides of the U-shaped legs as counter snap-in structures 6.11', wherein this snap-in connection also has steep snap-in flanks for preventing easy removal of the inserts 7.

In the longitudinal direction of the electrification strip 60, the inserts 7 are advantageously of a size corresponding to one unit of height. The inserts can also be designed for making contact with contact rails 10 used as data lines. For electric current supply, they are laid out in accordance with the standards as conventional plug-in units or sockets, for example for plug connections for non-heating devices. In the exemplary embodiment shown in FIGS. 7A to 7C, the contact pins 7.11 are designed as contact pins with a round cross section, and the contact openings 9.23 are also laid out as round openings.

Several current supply circuits can be established by the contact rails 10, for example a standard electrical current supply can be provided from the top of the frame structure 1, and an interruption-proof electrical current supply, which can be activated in case of need, from the bottom. It is also possible to establish three separate current supply circuits by the three phases of the a.c. electrical current net, for example with five contact rails 10, one of which is centrally arranged as the center ground rail, to each of which an appropriate number of inserts 7 is assigned, so that too large a load is prevented. In this case the inserts 7 can be appropriately connected at the factory. It is possible to produce an appropriately pre-equipped electrification strip 60 in accordance with customer requirements. Appropriately equipped electrification strips 60 can also be retrofitted at a later time.

Figure 8B:
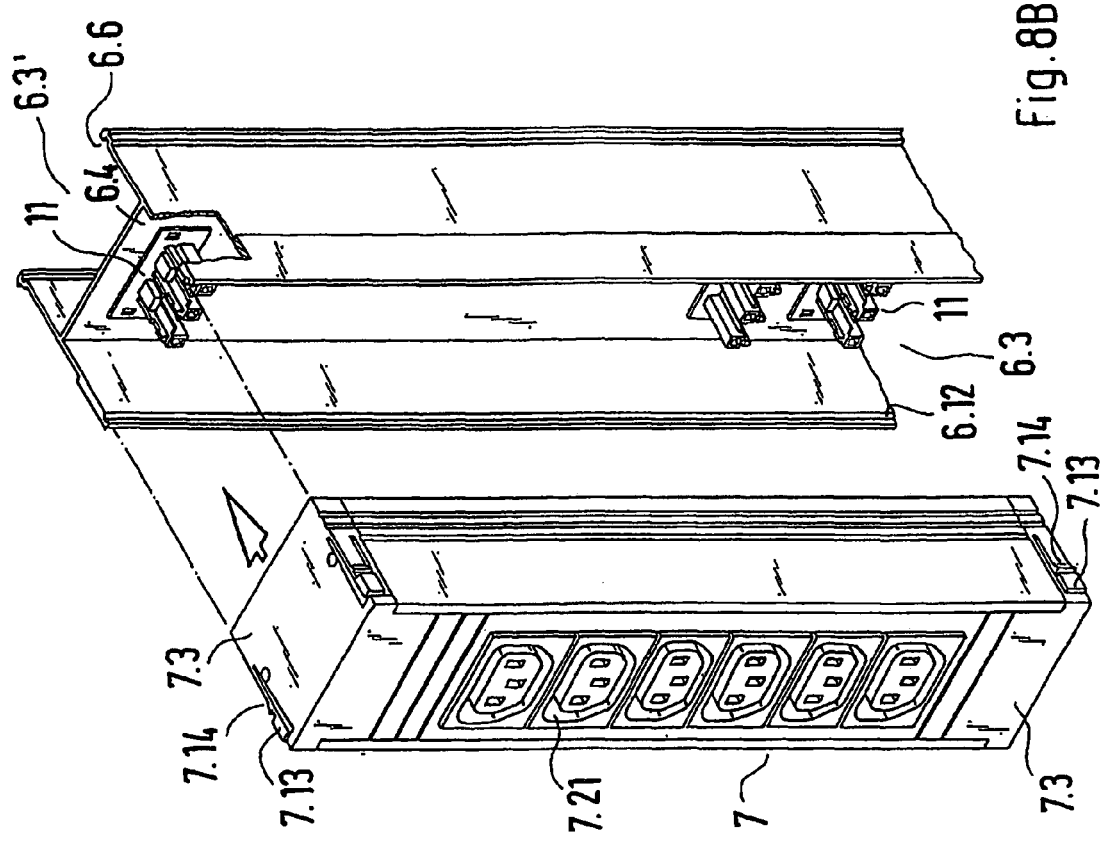
FIGS. 8A and 8B show a portion of a further electrification strip with an inserted or removed insert, each in a perspective plan view.
Figure 8A:
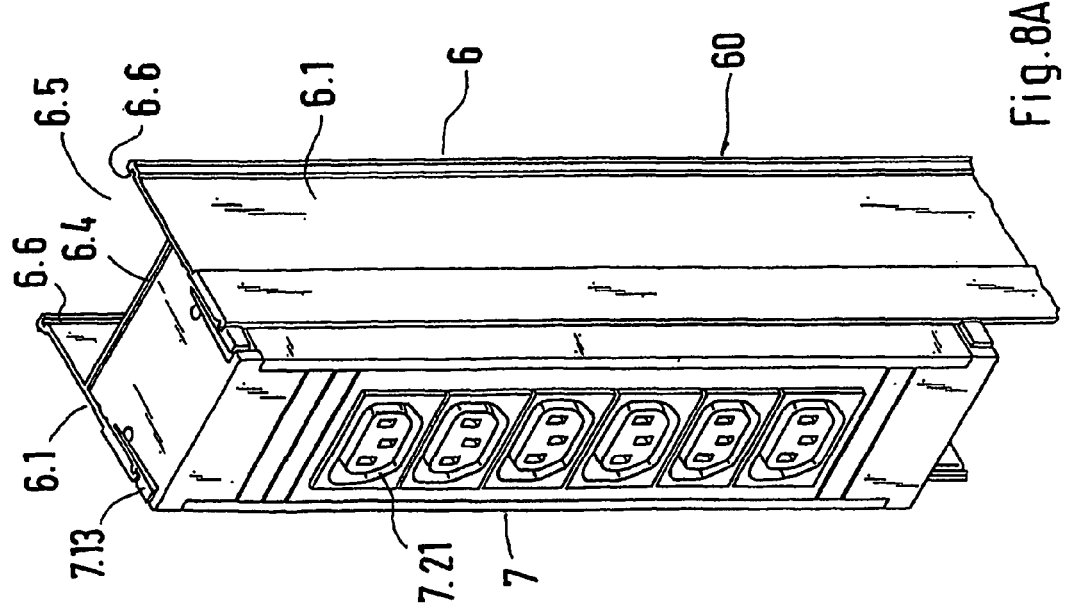
Figure 9:
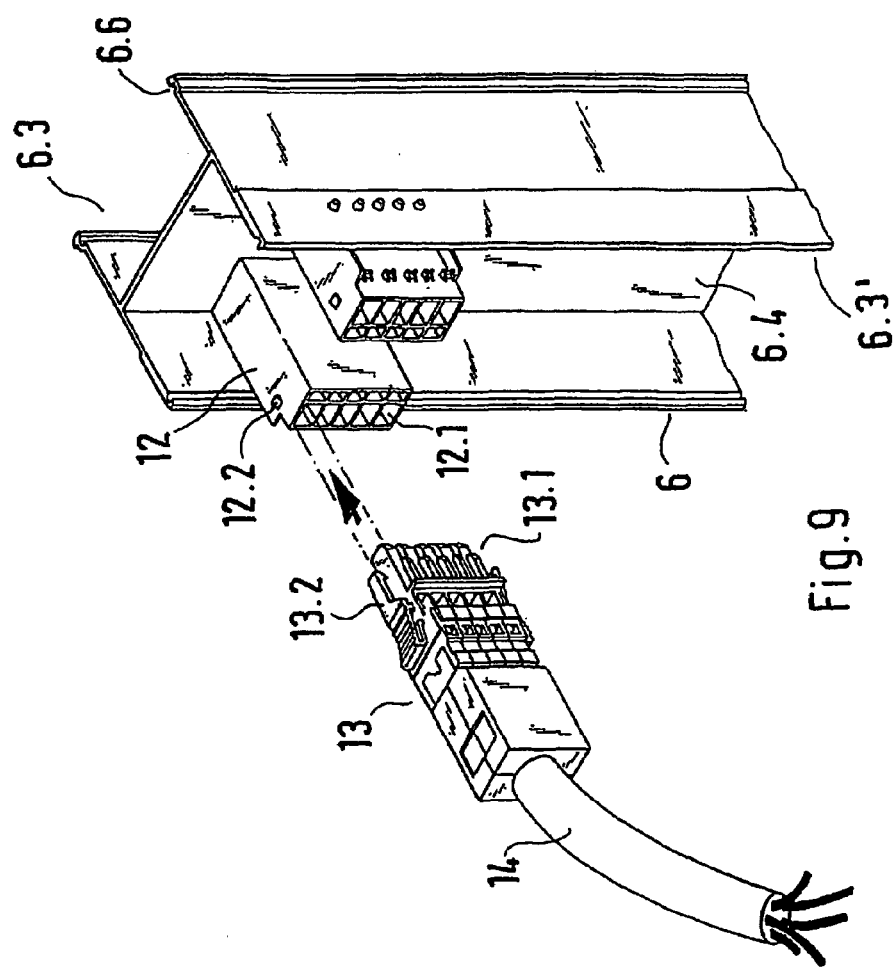
FIG. 9 shows a portion of the electrification strip in accordance with FIGS. 8A and 8B in the area of an electrical current feed-in arrangement in a perspective view.

The profiled receiving element 6 (electrification strip) in the exemplary embodiment shown in FIGS. 8A, 8B and 9 is constructed with an H-shaped cross section, and has a hollow space 6.3 on a front of a center wall 6.4 facing the user, and a further hollow space 6.5 on the back facing away from the user. The inserts 7, which have several, in the present case six, plug-in openings for standardized appliance plugs, can be releasably inserted into the hollow space 6.3, while the connecting lines 16 (see FIG. 10), which can include simple connecting cables or connecting wires, or also of contact rails 10, placed in the further hollow space 6.5. Receiving grooves 6.6 extending in the longitudinal direction, into which a cover can be slid, are formed in the free edge areas of the insides of the lateral walls 6.1 bordering the further hollow space 6.5. The cover can first be mounted at a short distance from the frame leg or the wall surface for mounting on the frame support or a cabinet wall or door or mounting plate, and the profiled receiving element 6 with the receiving grooves 6.6 can be pushed or snapped onto it. The counter snap-in elements 6.12 for snapping in the inserts 7 are formed on the free end area on inside of the lateral walls 6.1 bordering the hollow space 6.3 and in the present case can also have longitudinal grooves.

Figure 10:
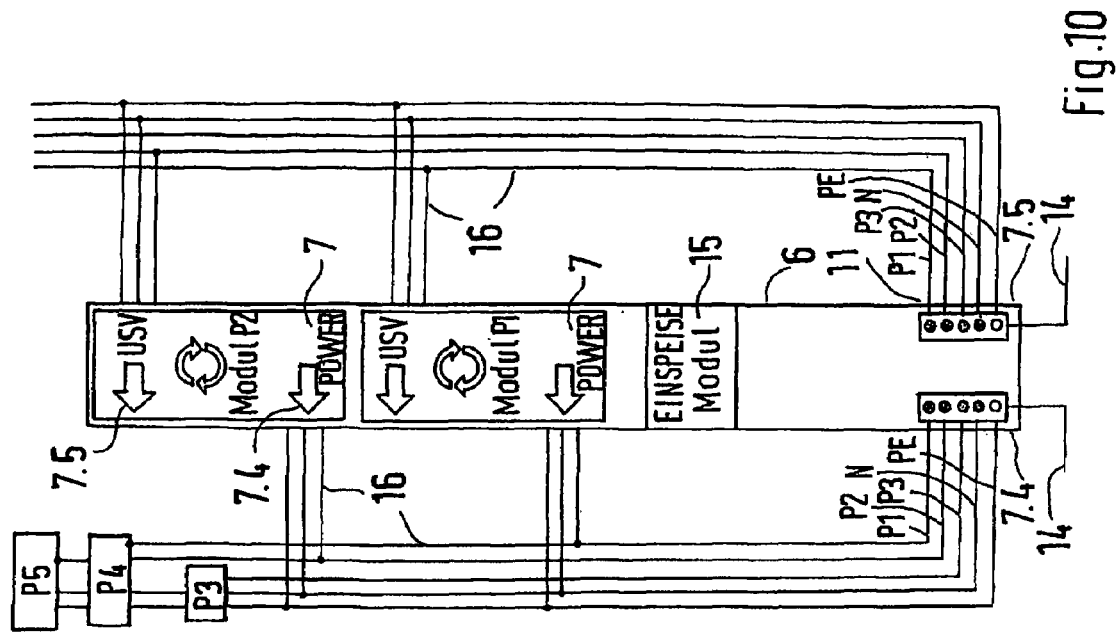
FIG. 10 shows a connecting diagram of an electrification arrangement, in particular in accordance with FIGS. 8A to 9.

The inserts 7 with the internally connected contact elements 7.11, which are accessible in a manner protected against electric shock through the plug-in openings 7.21, have cube-shaped module housings, which are closed off at their narrow sides, spaced apart from each other in the longitudinal direction, by closure pieces 7.3 in the form of front caps at their front. Inserts 7 with plug-in openings 7.21 of different thread, such as for shock-proof plugs, plugs for non-heating devices or different country standards, are provided. Laterally resilient snap-in fingers, each with snap-in elements 7.14 and manually operable actuating sections 7.13 are formed on the closure pieces 7.3. On their back facing away from the user, the inserts 7 have at least one plug unit, which is matched to electrical shock-proof plug-in couplings 11 inserted into cutouts in the center wall 6.4 and can be contacted with them. Two plug-in couplings 11 per insert 7 or modular housing are provided, which are connected to different electrical current supply devices 7.4, 7.5, such as a standard electrical current supply 7.4 and an interruption-proof electrical current supply device 7.5, for example, as shown in FIG. 10. The user can simply select the desired electrical current supply for the respective insert 7 in that, following the appropriate rotation of the insert 7 by 180°, the user brings the plug-in unit of the insert 7 in contact with the plug-in coupling 11 assigned to the appropriate electrical current supply device 7.4, 7.5.

As shown in FIG. 9, feed-in couplings 12, which are assigned to the electrical current supply devices 7.4, 7.5, are arranged on the front of the center wall 6.4 in the end area of the profiled receiving elements 6, which are also protected against electrical shock and can be connected via feed-in plugs 13 with current supply cables 14 to an electrical current supply. As shown in FIG. 10, the feed-in couplings 12, inserted into appropriate cutouts in the center wall 6.4 and connected to the connecting lines 16 at the back, can be integrated into a feed-in module 15, which can contain a line element for voltage conversion or adaptation, a current limiting device and/or a switching element (contactor) for the sequential activation of individual inserts 7 for protection against an overload. The feed-in couplings 12, or the electrical current supply devices 7.4, 7.5 make available several phases of a three-phase current net, to which the individual inserts 7 are distributed as shown in FIG. 10, in accordance with which the insert module P1 is connected to the phase P1, the insert module P2 to the phase P2, the next insert (indicated as P3) to the phase P3 and then the following insert again to the phase P1 and immediately, for example.

With the described structure of the electrification arrangement, the user has a simple device for retroactively equipping a switchgear cabinet or a rack, for example, with electrical current, wherein he can insert individual inserts as electrical current supply modules at suitable locations without difficulty and dependably.

The invention claimed is:

1. In a frame support for a rack or a switchgear cabinet, having an electrification arrangement combined with at least one frame leg (2, 3) or profiled mounting element (4), for at least one of supplying and removing electrical current one of to and from connectible devices, the frame support comprising:

the electrification arrangement having at least one separate electrification strip (60) attached to one of a frame leg (2, 3) and a profiled mounting element (4) formed by a hollow profiled receiving element (6) at least partially open on a long side and having at least one hollow space in which one of contact rails (10) and connection lines (16) are installed and protected against electric shock; and inserts (7) insertable into the electrification strip (60) and having plug receivers protected against electric shock for device plugs of devices to be connected, and contact elements (7.11) electrically contactable with the one of the contact rails (10) and the connecting lines (16), a profiled insulating element (9), in which the contact rails (10) are embedded and are accessible in a manner protected against electric shock through access openings (9.23) formed in the profiled insulating element (9), being inserted into at least one hollow space (6.3, 6.3') of the profiled receiving element (6), the at least one hollow space (6.3) being one of rectangular and square in cross section and having a base wall (6.2) located opposite the open longitudinal side adjoined by lateral walls (6.1), a bottom (9.3) of a bottom section of the profiled insulated element (9) in which the contact rails (10) are embedded facing one of the base wall (6.2) and a lateral wall (6.1), and the contact rails (10) contactable with the contact elements (7.11) via access openings (9.23), which are narrow for electric shock protection and cut into the bottom section of a side located opposite a bottom side, the insulated profiled element (9) fixed in place in the profiled receiving element (6) by snap-in structures (9.21, 9.22, 9.22') and complementary counter snap-in structures (6.11, 6.11') arranged in the profiled receiving element (6), the snap-in structures (9.21, 9.22, 9.22') and the counter snap-in structures (6.11, 6.11') having steep snap-in flanks opposite an insertion direction, for preventing removal of the profiled insulating element (9), the profiled insulating element (9) assembled from a profiled base insulating part (9.1) that receives the contact rails (10) in longitudinal chambers and insulates them from each other, and a profiled top insulating part (9.2) covering the contact rails (10) and having access openings (9.23), the access openings (9.23) formed by a group of at least two hole-shaped access openings assigned to separate contact rails (10), at least two access openings (9.23) offset from each other in the longitudinal direction of the profiled insulating element (9), the contact elements being contact pins (7.11) matched in size and position to the access openings (9.23), the inserts (7) having snap-in elements (7.14, 7.14') to prevent removal from one of the profiled receiving element (6) and the counter snap-in elements (6.12, 9.4) formed on the profiled insulating element (9) except by using a tool or an actuating element (7.13) which releases a snapped-in connection, one of at least three contact rails (10) embedded in the profiled insulating element (9) and three connecting lines (16) forming at least two separate current supply circuits, a number of the inserts (7) used being distributable over different current supply circuits, a dimension of the inserts (7) in the longitudinal direction of the electrification strip (60) being one of a unit of height and a whole-number multiple of the unit of height, the inserts (7) receiving at least one appliance plug, the profiled receiving element (6) having on at least one longitudinal side fastening elements for connection with one of at least one frame leg (2, 3) and a profiled mounting element (4, 5), the fastening elements each being one of a screw, a clip, a snap-in element, a plug and a clamping connection, the profiled receiving element (6) being H-shaped in a cross section formed by two lateral walls (6.1) and a center wall (6.4), and the inserts (7) being placed into the hollow space (6.3) on a side of the center wall (6.4) facing the user and one of the contact rails (10) and the connecting lines (16) being placed into the hollow space (6.3') facing away from the user and being accessible through the center wall (6.4), cutouts in the center wall (5.4), into which plug-in couplings (11) are inserted and protected against electric shock, which are accessible from the user side, and at least one plug unit being matched to the plug-in couplings (11) arranged on the back of the inserts (7) facing away from the user.

2. The frame support in accordance with claim 1, wherein an overload release device is integrated into the inserts.

3. The frame support in accordance with claim 1, wherein two plug-in couplings (11) per insert (7) are spaced apart from each other in the longitudinal direction of the profiled receiving element and are connected to different current supply arrangements (7.4, 7.5), and backs of the inserts (7) for selecting one of the two current supply arrangements (7.4, 7.5) is insertable into the profiled receiving element (6) rotated by 180° and can be connected with the respective plug-in coupling (11).

4. The frame support in accordance with claim 3, wherein the inserts (7) are modular housings with cap-like closure pieces (7.3) which, from one of the adjoining narrow sides are placed on ends remote from each other in the longitudinal direction, on sides of which the snap-in elements (7.14) are formed of one piece with releasable resilient snap-in fingers and actuating elements (7.13).

5. The frame support in accordance with claim 4, wherein an overload release device is integrated into the inserts.

6. The frame support in accordance with claim 5, wherein at least one electric shock protected current feed-in coupling (12) for the current supply is arranged in an end section of the profiled receiving element (6), and a current feed-in plug (13) is matched to the current feed-in coupling (12) and has a connected current supply cable (14).

7. The frame support in accordance with claim 6, wherein the current feed-in coupling (12) is embodied on or in a feed-in module (15), and a line element for voltage conversion or adaptation, a current limiting device and/or a switching element for the sequential activation of individual inserts (7) is integrated into the feed-in module (15).

8. In a frame support for a rack or a switchgear cabinet, having an electrification arrangement combined with at least one frame leg (2, 3) or profiled mounting element (4), for at least one of supplying and removing electrical current one of to and from connectible devices, the frame support comprising:
the electrification arrangement having at least one separate electrification strip (60) attached to one of a frame leg (2, 3) and a profiled mounting element (4) formed by a hollow profiled receiving element (6) at least partially open on a long side and having at least one hollow space in which one of contact rails (10) and connection lines (16) are installed and protected against electric shock; and
inserts (7) insertable into the electrification strip (60) and having plug receivers protected against electric shock for device plugs of devices to be connected, and contact elements (7.11) electrically contactable with the one of the contact rails (10) and the connecting lines (16), at least one electric shock protected current feed-in coupling (12) for the current supply arranged in an end section of the profiled receiving element (6), and a current feed-in plug (13) matched to the current feed-in coupling (12) and having a connected current supply cable (14).

9. In a frame support for a rack or a switchgear cabinet, having an electrification arrangement combined with at least one frame leg (2, 3) or profiled mounting element (4), for at least one of supplying and removing electrical current one of to and from connectible devices, the frame support comprising:
the electrification arrangement having at least one separate electrification strip (60) attached to one of a frame leg (2, 3) and a profiled mounting element (4) formed by a hollow profiled receiving element (6) at least partially open on a long side and having at least one hollow space in which one of contact rails (10) and connection lines (16) are installed and protected against electric shock; and inserts (7) insertable into the electrification strip (60) and having plug receivers protected against electric shock for device plugs of devices to be connected, and contact elements (7.11) electrically contactable with the one of the contact rails (10) and the connecting lines (16), the inserts (7) being modular housings with cap-like closure pieces (7.3) which, from one of the adjoining narrow sides are placed on ends remote from each other in the longitudinal direction, on sides of which the snap-in elements (7.14) are formed of one piece with releasable resilient snap-in fingers and actuating elements (7.13).

10. The frame support in accordance with claim 9, wherein the inserts (7) have snap-in elements (7.14, 7.14') to prevent removal from one of the profiled receiving element (6) and the counter snap-in elements (6.12, 9.4) formed on the profiled insulating element (9) except by using a tool or an actuating element (7.13) which releases a snapped-in connection.

11. The frame support in accordance with claim 9, wherein one of at least three contact rails (10) are embedded in the profiled insulating element (9) and three connecting lines (16) form at least two separate current supply circuits.

12. The frame support in accordance with claim 9, wherein a dimension of the inserts (7) in the longitudinal direction of the electrification strip (60) is one of a unit of height and a whole-number multiple of the unit of height, and the inserts (7) receive at least one appliance plug.

13. The frame support in accordance with claim 9, wherein the profiled receiving element (6) has on at least one longitudinal side fastening elements for connection with one of at least one frame leg (2, 3) and a profiled mounting element (4, 5).

14. The frame support in accordance with claim 9, wherein the profiled receiving element (6) is H-shaped in a cross section formed by two lateral walls (6.1) and a center wall (6.4), and the inserts (7) are placed into the hollow space (6.3) on a side of the center wall (6.4) facing the user and one of the contact rails (10) and the connecting lines (16) are placed into the hollow space (6.3') facing away from the user and are accessible through the center wall (6.4).

15. The frame support in accordance with claim 9, used for an electrification arrangement for the rack or a switchgear cabinet.

16. The frame support in accordance with claim 15, wherein the current feed-in coupling (12) is embodied on or in a feed-in module (15), and a line element for voltage conversion or adaptation, a current limiting device and/or a switching element for the sequential activation of individual inserts (7) is integrated into the feed-in module (15).

17. The frame support in accordance with claim 9, wherein a profiled insulating element (9), in which the contact rails (10) are embedded and are accessible in a manner protected against electric shock through access openings (9.23) formed in the profiled insulating element (9), is inserted into at least one hollow space (6.3, 6.3') of the profiled receiving element (6).

18. The frame support in accordance with claim 17, wherein the insulated profiled element (9) is fixed in place in the profiled receiving element (6) by snap-in structures (9.21, 9.22, 9.22') and complementary counter snap-in structures (6.11, 6.11') arranged in the profiled receiving element (6).

19. The frame support in accordance with claim 17, wherein the profiled insulating element (9) is assembled from a profiled base insulating part (9.1) that receives the contact rails (10) in longitudinal chambers and insulates them from each other, and a profiled top insulating part (9.2) covering the contact rails (10) and having access openings (9.23).

20. The frame support in accordance with claim 17, wherein the access openings (9.23) of each of the inserts (7) are formed by a group of at least two hole-shaped access openings assigned to separate contact rails (10).

21. The frame support in accordance with claim 17, wherein the contact elements are contact pins (7.11) matched in size and position to the access openings (9.23).

22. The frame support in accordance with claim 17, wherein the at least one hollow space (6.3) is one of rectangular and square in cross section and has a base wall (6.2) located opposite the open longitudinal side adjoined by lateral walls (6.1), a bottom (9.3) of a bottom section of the profiled insulated element (9) in which the contact rails (10) are embedded faces one of the base wall (6.2) and a lateral wall (6.1), and the contact rails (10) are contactable with the contact elements (7.11) via access openings (9.23), which are narrow for electric shock protection and cut into the bottom section of a side located opposite a bottom side.

23. The frame support in accordance with claim 22, wherein the insulated profiled element (9) is fixed in place in the profiled receiving element (6) by snap-in structures (9.21, 9.22, 9.22') and complementary counter snap-in structures (6.11, 6.11') arranged in the profiled receiving element (6).

24. The frame support in accordance with claim 23, wherein the snap-in structures (9.21, 9.22, 9.22') and the counter snap-in structures (6.11, 6.11') have steep snap-in flanks opposite an insertion direction, for preventing removal of the profiled insulating element (9).

25. The frame support in accordance with claim 24, wherein the profiled insulating element (9) is assembled from a profiled base insulating part (9.1) that receives the contact rails (10) in longitudinal chambers and insulates them from each other, and a profiled top insulating part (9.2) covering the contact rails (10) and having access openings (9.23).

26. The frame support in accordance with claim 25, wherein the access openings (9.23) are formed by a group of at least two hole-shaped access openings assigned to separate contact rails (10).

27. The frame support in accordance with claim 26, wherein at least two access openings (9.23) are offset from each other in the longitudinal direction of the profiled insulating element (9).

28. The frame support in accordance with claim 27, wherein the contact elements are contact pins (7.11) matched in size and position to the access openings (9.23).

29. The frame support in accordance with claim 28, wherein the inserts (7) have snap-in elements (7.14, 7.14') to prevent removal from one of the profiled receiving element (6) and the counter snap-in elements (6.12, 9.4) formed on the profiled insulating element (9) except by using a tool or an actuating element (7.13) which releases a snapped-in connection.

30. The frame support in accordance with claim 29, wherein one of at least three contact rails (10) are embedded in the profiled insulating element (9) and three connecting lines (16) form at least two separate current supply circuits.

31. The frame support in accordance with claim 30, wherein a number of the inserts (7) used is distributable over different current supply circuits.

32. The frame support in accordance with claim 31, wherein a dimension of the inserts (7) in the longitudinal direction of the electrification strip (60) is one of a unit of height and a whole-number multiple of the unit of height, and the inserts (7) receive at least one appliance plug.

33. The frame support in accordance with claim 32, wherein the profiled receiving element (6) has on at least one longitudinal side fastening elements for connection with one of at least one frame leg (2, 3) and a profiled mounting element (4, 5).

34. The frame support in accordance with claim 33, wherein the fastening elements each is one of a screw, a clip, a snap-in element, a plug and a clamping connection.

35. The frame support in accordance with claim 34, wherein the profiled receiving element (6) is H-shaped in a cross section formed by two lateral walls (6.1) and a center wall (6.4), and the inserts (7) are placed into the hollow space (6.3) on a side of the center wall (6.4) facing the user and one of the contact rails (10) and the connecting lines (16) are placed into the hollow space (6.3') facing away from the user and are accessible through the center wall (6.4).

* * * * *